United States Patent [19]

Grossman et al.

[11] Patent Number: 5,712,967
[45] Date of Patent: Jan. 27, 1998

[54] METHOD AND SYSTEM FOR GRACEFUL RECOVERY FROM A FAULT IN PERIPHERAL DEVICES USING A VARIETY OF BUS STRUCTURES

[75] Inventors: Leonid Grossman, Cupertino; Sherman Lee, Rancho Palos Verdes; Ramkrishna Vepa, Fremont, all of Calif.

[73] Assignee: Advanced Micro Devices, Inc., Sunnyvale, Calif.

[21] Appl. No.: 635,843

[22] Filed: Apr. 22, 1996

[51] Int. Cl.$^6$ ........................................ G06F 11/00
[52] U.S. Cl. .......................... 395/182.01; 395/183.19; 395/183.2
[58] Field of Search ............... 395/182.01, 182.03, 395/182.21, 183.2, 185.09, 183.19

[56] References Cited

U.S. PATENT DOCUMENTS

| | | | |
|---|---|---|---|
| 4,315,310 | 2/1982 | Baylies | 364/200 |
| 5,150,465 | 9/1992 | Bush et al. | 395/275 |
| 5,313,627 | 5/1994 | Amini et al. | 395/575 |
| 5,454,081 | 9/1995 | Thome | 395/281 |
| 5,499,346 | 3/1996 | Amini et al. | 395/308 |

*Primary Examiner*—Robert W. Beausoliel, Jr.
*Assistant Examiner*—Dieu-Minh Le
*Attorney, Agent, or Firm*—Sawyer & Associates

[57] ABSTRACT

A method and system for resetting a peripheral device which could use a variety of buses have been disclosed. The method and system determine what bus type the peripheral device has. The method and system then automatically execute a reset process capable of resetting the peripheral device having that bus type. A beneficial aspect of this invention is allowing a peripheral device to gracefully recover from a fault. In this aspect, the method detects whether a peripheral device fault has occurred. Where the fault has occurred, the method determines whether any of a plurality of processes executable by the peripheral device is being executed. The processes comprise those processes which could result in significant loss of data, loss of connection to a network, or adversely affect performance if the peripheral device is reset during execution. If none of the processes is being executed, the method automatically resets the peripheral device. The automatic reset process determines the bus type of the peripheral device. The automatic reset process then automatically executes a reset process capable of resetting the peripheral device having that bus type. According to the method and system, a peripheral device which may use a variety of buses can be reset or made to recover from faults without user intervention, without loss of connection to any networks, and with minimal loss of data.

12 Claims, 2 Drawing Sheets

METHOD AND SYSTEM FOR GRACEFUL RECOVERY FROM A FAULT IN PERIPHERAL DEVICES USING A VARIETY OF BUS STRUCTURES

FIELD OF THE INVENTION

The present invention relates to network and peripheral device drivers and more particularly to a method and system for graceful recovery from a peripheral device fault in peripheral devices having a variety of bus structures.

BACKGROUND OF THE INVENTION

In order to run peripheral applications, operating systems must be capable of interfacing with the application. In order to do so, peripheral devices called network controllers are employed. Typically, a network or device driver is used to control and communicate with the network controller or peripheral device. Usually an interface layer exists between the operating system and the peripheral device. The portion of the interface layer dedicated to communication with the peripheral device typically comprises the device driver.

Typically, a device driver is structured in layers. The upper layers of the device driver are generally dedicated to communication with the operating system and network protocols. The lower layers of the device driver are usually dedicated to interfacing with hardware, such as the network controller or other peripheral device.

A given network or device driver should be compatible with a variety of operating systems. Typically, each operating system functions differently. For example, an operating system may be either single or multi-tasking. Because the lower layers of the device driver are implemented prior to a specific operating system being chosen, the lower levels of the device drivers must be compatible with different operating systems. For example, the lower layers of a device driver must be capable of being adapted to both single threaded and multi-tasking operating systems. In other words, any process that the device driver uses to control the network controller or peripheral device must function in various types of operating systems. Consequently, the lower layers of the device driver must be capable of controlling the hardware in a manner compatible with both single threaded and multi-tasking operating systems.

A network or device driver should also be able to address faults associated with the network controller or peripheral device. For example, a typical fault occurring in some network controllers is that the network controllers fail or stop without warning. This is particularly true of PC net controllers. In addition, the fact that a fault has occurred is not detected by typical network or device drivers. Other peripheral devices may also be subject to such faults.

A fault associated with peripheral devices, particularly network controllers, is that they are subject to a variety of failures that occur without warning. Although they are subject to failure, the specifications for these network controllers or peripheral devices indicate that the network controller or peripheral device will not fail without warning. This is particularly true of PC net controllers. Typical network drivers are unable to detect the fact that a fault has occurred or make the peripheral device gracefully recover from such a fault.

For example, when a data packet is to be sent, the network controller may attempt to access a data bus being used. The network controller becomes "starved," resulting in a data underflow condition. The network controller should wait, flag the error, and attempt to access the bus at a later time. Instead, the controller simply stops.

Although there should be bits in the network controller indicating the chip's status, conventional network drivers do not read these bits. Typical network drivers assume that the network controllers do not stop due to underflow conditions because the specifications for network controllers state that the network controller is functional under these conditions. In addition, it may be impossible for the network driver to determine whether the network controller is working.

In direct memory access ("DMA") network controllers, for example, data are copied directly to main memory from the data packet. During this process, the network driver cannot check to ensure that the network controller is still functioning. Similarly, even in programmed input/output ("IO"), the network driver can only check to ensure that the network controller has not stopped during the period that data are not being transferred. Consequently, typical network drivers follow the protocols for the network controller, only checking the status of the data packet which does not reflect the fact that the network controller has stopped. Thus, conventional network drivers neither detect nor allow for graceful recovery from a network controller fault.

A network controller may also stop when, for some reason, the controller misses a data packet it should receive. For example, all the buffers of a network controller may be full when a packet arrives. The network controller will not receive the packet, resulting in a missed packet condition. Consequently, the controller stops even though the specifications for the network controller state that the controller should function under these conditions. As discussed with respect to DMA and programmed IO protocols discussed above, typical drivers are unable to tell that the controller is not functioning. Consequently, the network controller does not recover from the fault without user intervention and the potential for loss of information.

In order to provide a smooth interface between the operating system and the peripheral device, the device driver must be able to allow the system to gracefully recover from faults. A graceful recovery from a fault is one in which user intervention, such as rebooting the computer, is not required, there is minimal loss of data, no other peripheral device faults are caused, and, in the case of network controllers, connection to the network is generally not broken.

As previously discussed, typical device or network drivers do not ensure that the network controller is functioning partly because the network controller is not supposed to stop without warning. Conventional device or network drivers also do not check to ensure that the network controller is functioning because of the extra time and code required. Thus, these drivers rely on the user to reboot the computer in order to recover from the fault. Such a recovery can result in a loss of a significant amount of data or a lost connection to the network. Thus, a method and system for graceful recovery are desired.

A conventional method for addressing problems due to failures in a peripheral device or network controller is using a "dead man's timer" in the device or network driver. The "dead man's timer" resets the peripheral device or network controller at preset intervals. Consequently, user intervention is not required. However, the "dead man's timer" can adversely affect the performance of the peripheral device or network driver. For example, the timer can reset the controller while the network controller is receiving or transmitting data. This problem is especially noticeable in systems which are multi-tasking or single threaded but simultaneously execute two process by switching between tasks and preset intervals. If the controller is reset while two processes are being executed, the network controller may receive data for a process which the network controller is not prepared to execute, thereby adversely affecting the network controller's performance.

Typical peripheral devices or network controllers utilize different buses, such as PCI or ISA. However, most conventional device or network drivers are not compatible with more than one bus structure. Because most conventional device drivers can control only peripheral devices having a specific type of bus structure, more than one device driver is required to be able to control peripheral devices using different buses. In addition, even those device or network drivers that are capable of interfacing with different bus structures are not capable of enabling a peripheral device or network controller to gracefully recover from a fault.

Accordingly, what is needed is a method and system for gracefully recovering from a fault in a network controller or other peripheral device. The method and system should be compatible with a variety of bus structures. In addition, it would be beneficial if the method and system are compatible with a variety of operating systems. The present invention addresses such a need.

SUMMARY OF THE INVENTION

The present invention provides a method and system for resetting a peripheral device which could use a variety of buses. The method and system first determine what the particular bus type of the peripheral device is. The method and system then automatically execute a reset process capable of successfully resetting the peripheral device having the particular bus type previously determined.

An aspect of this invention that is particularly beneficial is its use in allowing a peripheral device to gracefully recover from a fault. In this aspect of the method and system, the method detects whether a peripheral device has suffered from a peripheral device fault. Where the peripheral device fault has occurred, the method determines whether any of a plurality of processes executable by the peripheral device is currently being executed by the peripheral device. The plurality of processes comprises those process which could result in significant loss of data, loss of connection to a network or adversely affect the performance of the peripheral device if the peripheral device is reset during execution of any of the plurality of processes. If none of the plurality of processes is being executed by the peripheral device, the method automatically resets the peripheral device. The automatic reset process first determines what the particular bus type of the peripheral device is. The automatic reset process then automatically executes a reset process capable of successfully resetting the peripheral device having the particular bus type previously determined.

According to the method and system disclosed, a peripheral device which may use a variety of buses can be reset. In addition, such peripheral devices can be made to recover from faults without user intervention, without loss of connection to any networks, and with minimal loss of data. Reliability and flexibility of the system is improved, thereby increasing overall system performance.

DESCRIPTION OF THE INVENTION

Figure 1:
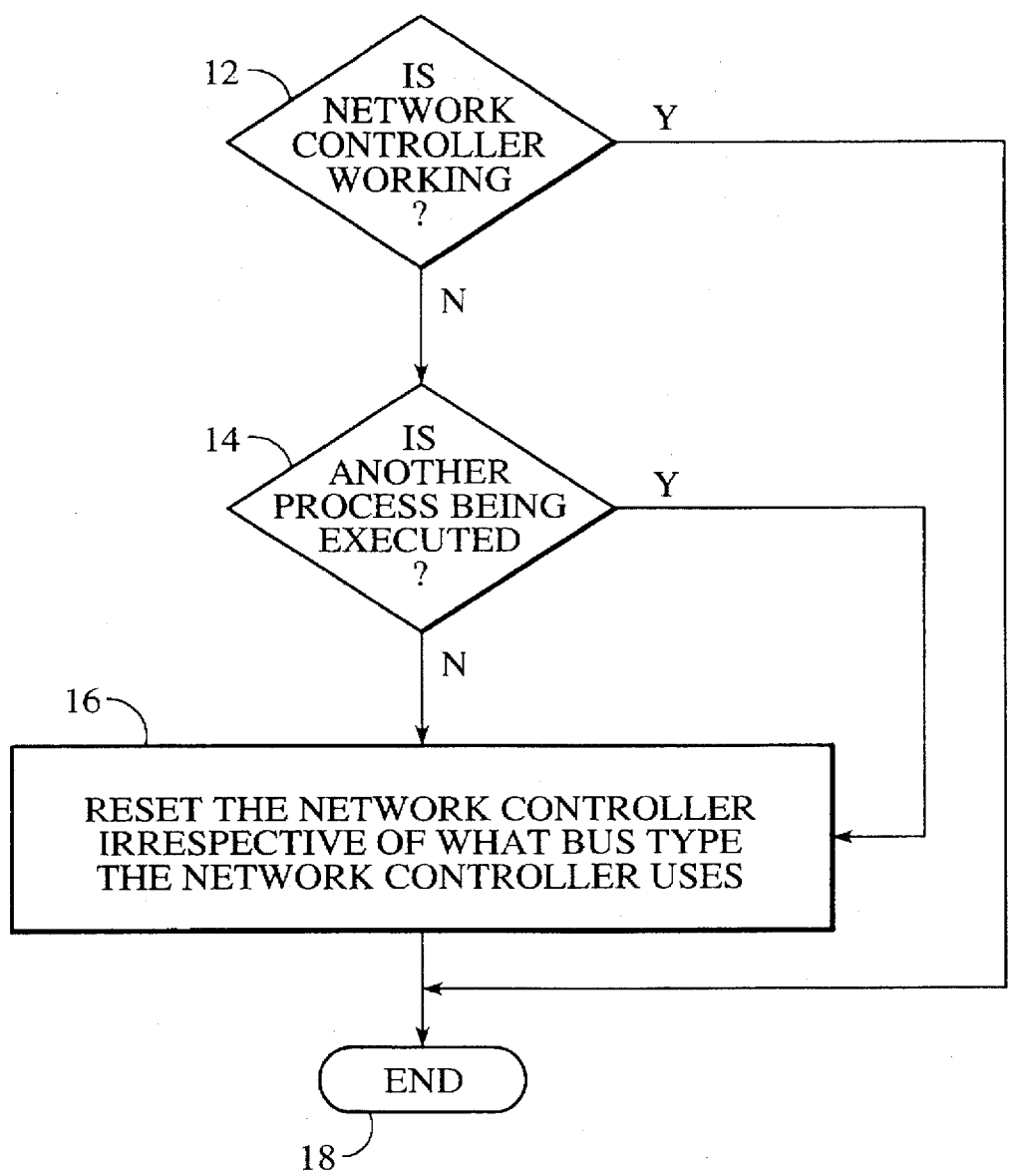
FIG. 1 is a simplified flow chart depicting an embodiment of the method for gracefully recovering from a peripheral device fault.

The present invention relates to an improvement in peripheral device drivers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described.

In order to run peripheral devices, such as network controllers, device drivers are employed. Typically, a network or device driver is used to control and communicate with the network controller or peripheral device.

A network or device driver should be able to address faults associated with the network controller or peripheral device. For example, a typical fault occurring in some network controllers is that the network controllers fail or stop without warning. This is particularly true of PC net controllers. In addition, the fact that a fault has occurred is not detected by typical network or device drivers. Other peripheral devices may also be subject to such faults.

In order to "gracefully recover from a fault, a network controller or peripheral device must recover without user intervention, without significant loss of data, without causing further faults, and, generally, with no loss of connection to a network. The method and system used to enable the peripheral device to gracefully recover from the fault should not adversely affect the performance of the peripheral device. For example, the "dead man's timer," discussed above could adversely affect a network controller's performance if the network controller is reset during a receive of data. Thus, when a network controller or peripheral device fails to gracefully recover from a fault, the network or device driver's ability to access and control the network controller or peripheral device is negatively affected. A given network or device driver should also be compatible with a variety of operating systems. Typically, each operating system functions differently. For example, an operating system may be either single threaded or multi-tasking. A network or device driver should be compatible with both types of operating systems.

Finally, a network or device driver should be compatible with different bus systems. The protocols for peripheral devices or network controllers using different buses are different. In order to control a peripheral device or network controller, the device or network driver must be compatible with the bus structure used by the particular peripheral device or network controller. Although typical drivers function when the network controller or peripheral device operates as expected, those with ordinary skill in the art will realize that typical drivers are incapable of functioning when the peripheral device or network controller suffers from erratic faults. Although a "dead man's timer" has been implemented to address erratic stops of the network controller or peripheral device, the "dead man's timer" has problems associated with it. These problems are particularly significant in multi-tasking environments. In addition, no conventional device or network driver is capable of enabling network controllers or peripheral devices using different bus structures to gracefully recover from a fault.

The present invention provides for a method and system for a peripheral device driver which can detect and allow for graceful recovery from faults in the peripheral device. The present invention will be described in terms of a network driver which controls a network controller. However, one of ordinary skill in the art will readily recognize that this method and system will operate effectively for other types of device drivers and peripheral devices, respectively.

To more particularly illustrate the method and system in accordance with the present invention, refer now to FIG. 1 which displays a simplified flow chart of one embodiment of the method 10. The method 10 first determines whether the network controller is working, via step 12. If the network controller is working, it has not suffered from a fault and does not need to be reset. Consequently, the method 10 skips to step 18 when the network controller is working.

If the network controller is not working, then it is determined if any of a plurality processes is being executed, via step 14. The plurality of processes comprises those processes which could result in significant loss of data, loss of connection to a network or adversely affect the performance of the peripheral device if the peripheral device is reset during execution of any of the plurality of processes. Examples of these processes are a reset of the network controller, a receive of data, or a transmission of data. If another process is being executed, the method 10 does not reset the network controller. Consequently, the problems associated with the "dead man's timer," are avoided.

If another process is not being executed, then the network controller is reset via step 16. In one embodiment of the method 10, step 16 includes notifying the network driver that the network controller is being reset. Because step 16 is only carried out when another process is not being implemented, the network controller's functions are not adversely affected and there is minimal loss of data. The reset carried out in step 16 also does not result in losing connection to the network. In addition, since step 16 is automatically performed by the method 10, user intervention is unnecessary. Consequently, the method 10 allows for graceful recovery from a network controller fault.

Figure 2:
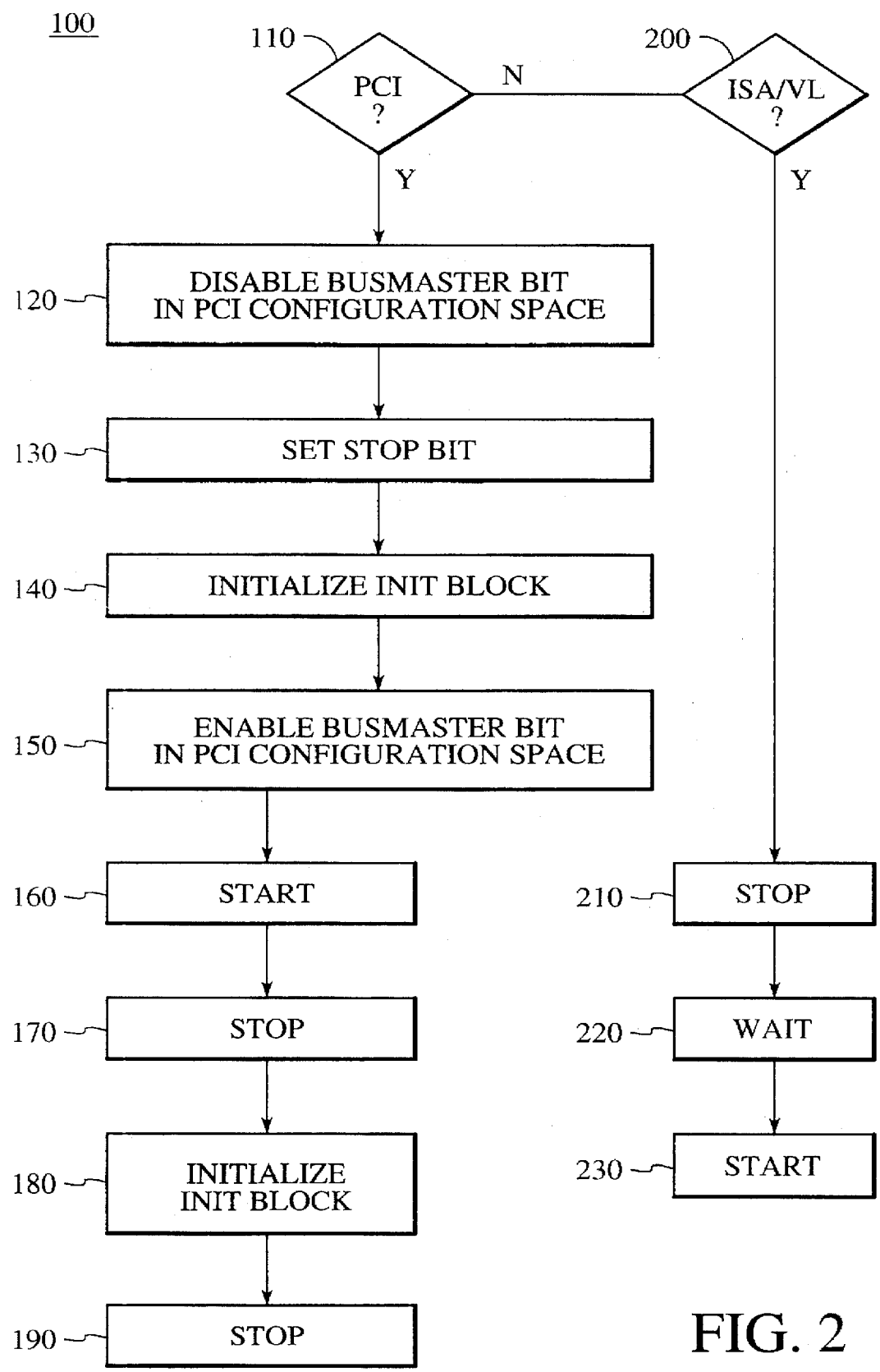
FIG. 2 is a flow chart depicting a simplified embodiment of the method for gracefully recovering from a fault where the bus structure of the peripheral device can either be PCI or ISA.

Step 16 also resets network controllers using a variety of buses. Essentially, step 16 consists of identifying the type of bus structure which the network controller uses and implementing a reset process appropriate to that bus structure. To more particularly illustrate this aspect of the method and system, refer to FIG. 2. FIG. 2 depicts a method 100 for resetting a network controller which uses either PCI or ISA buses.

The method 100 first determines whether the network controller uses a PCI bus structure, via step 110. If the network controller does not use a PCI bus, the method 100 skips to step 200, which determines if the network controller uses an ISA bus. Note that in one embodiment of the method 100, steps 110 and 200, which determine what type of bus the peripheral device uses, can be implemented when the network driver is first loaded and the information regarding the bus structured stored until needed.

If the peripheral device uses PCI buses, the method 100 then disables the busmaster bit in step 120. Next, the stop bit is set in step 130. The INIT block is then initialized via step 140. The busmaster bit is then enabled and the network controller started via steps 150 and 160, respectively. Because PCI network may not start properly, the method 100 stops the network controller using step 170. The INIT block is then reinitialized and the network controller restarted via steps 180 and 190, respectively. Thus, a network controller using PCI buses is properly reset.

If the network controller does not use a PCI bus structure, the method 100 checks to determine whether the network controller uses an ISA bus in step 200. If the network controller uses an ISA bus, the method 100 stops the network controller via step 210. To ensure that the reset is properly performed, the method then pauses via step 220. Finally, the network controller is restarted and initialized in step 230. Consequently, a network controller using ISA buses is properly reset.

A method and system have been disclosed for providing graceful recovery from a network controller or peripheral device fault. This method and system include a method and system for resetting a network controller or peripheral device which could use a variety of bus structures. The method and system provide graceful recovery from a fault by detecting the fault and, when necessary, resetting the network controller only when any of a plurality of processes is not currently being implemented. The reset is accomplished by determining what type of bus the network controller or peripheral device uses and implementing a reset process tailored ensure successful reset for that type of bus structure.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for resetting a peripheral device which could use a variety of buses, the variety of buses including PCI or ISA buses, comprising the steps of:
 (a) determining a particular bus type of the peripheral device, step (a) further comprising the steps of:
  (a1) determining whether the particular bus type used by the peripheral device is PCI;
  (a2) determining whether the particular bus type used by the peripheral device is ISA if the particular bus type used by the peripheral device is not PCI; and
 (b) automatically executing a reset process capable of successfully resetting the peripheral device having the particular bus type determined in step (a) without interrupting any of a plurality of processes, the plurality of processes further comprising those processes which could result in significant loss of data, loss of connection to a network or adversely affect the performance of the peripheral device if the peripheral device is reset during execution of any of the plurality of processes, automatically executing the reset step (b) further comprising the steps of:
  (b1) disabling a busmaster bit;
  (b2) setting a stop bit;
  (b3) initializing at least a portion of the peripheral device;
  (b4) enabling the busmaster bit;
  (b5) starting the peripheral device;
  (b6) stopping the peripheral device;
  (b7) initializing at least the portion of the peripheral device; and
  (b8) starting the peripheral device;
 if the particular bus type used by the peripheral device is PCI.

2. The method of claim 1 wherein automatically executing the reset step further comprises the steps of:
 (b9) stopping the peripheral device;
 (b10) waiting a predetermined amount of time;
 (b11) starting and initializing the peripheral device if the particular bus type used by the peripheral device is ISA.

3. A method for resetting a network controller which could use a variety of buses, the variety of buses including PCI or ISA buses, comprising the steps of:
  (a) determining a particular bus type of the network controller, step (a) further comprising the steps of:
    (a1) determining whether the particular bus type used by the network controller is PCI; and
    (a2) determining whether the particular bus type used by the network controller is ISA if the particular bus type used by the network controller is not PCI; and
  (b) automatically executing a reset process capable of successfully resetting the network controller having the particular bus type determined in step (a) without interrupting any of a plurality of processes, the plurality of processes further comprising those processes which could result in significant loss of data, loss of connection to a network or adversely affect the performance of the network controller if the network controller is reset during execution of any of the plurality of processes, automatically executing the reset step (b) further comprising the steps of:
    (b1) disabling a busmaster bit;
    (b2) setting a stop bit;
    (b3) initializing at least a portion of the network controller;
    (b4) enabling the busmaster bit;
    (b5) starting the network controller;
    (b6) stopping the network controller;
    (b7) initializing at least the portion of the network controller; and
    (b8) starting the network controller
  if the particular bus type used by the network controller is PCI.

4. The method of claim 3 wherein automatically executing the reset step further comprises the steps of:
  (b9) stopping the network controller;
  (b10) waiting a predetermined mount of time;
  (b11) starting and initializing the network controller
if the particular bus type used by the network controller is ISA.

5. A method for detecting and enabling a peripheral which could use a variety of buses to gracefully recover from a peripheral device fault, the variety of buses further including PCI and ISA buses, comprising the steps of:
  (a) detecting whether the peripheral device has undergone a peripheral device fault;
  (b) determining whether any of a plurality of processes is currently being executed if the peripheral device fault has occurred, the plurality of processes further comprising those processes which could result in significant loss of data, loss of connection to a network or adversely affect the performance of the peripheral device if the peripheral device is reset during execution of any of the plurality of processes; and
  (c) automatically resetting the peripheral device if none of the plurality of processes is currently being executed, automatically resetting step (c) further comprising the steps of:
    (c1) determining a particular bus type of the peripheral device, wherein step (c1) further includes the steps of:
      (i) determining whether the particular bus type used by the peripheral device is PCI; and
      (iii) determining whether the particular bus type used by the peripheral device is ISA if the particular bus type used by the peripheral device is not PCI; and
    (c2) automatically executing a reset process capable of successfully resetting the peripheral device having the particular bus type determined in step (c1), automatically executing the reset step (c2) further comprising the steps of:
      (i) disabling a busmaster bit;
      (ii) setting a stop bit;
      (iii) initializing at least a portion of the peripheral device;
      (iv) enabling the busmaster bit;
      (v) starting the peripheral device;
      (vi) stopping the peripheral device;
      (vii) initializing at least the portion of the peripheral device; and
      (viii) starting the peripheral device;
  if the particular bus type used by the peripheral device is PCI.

6. The method of claim 5 wherein automatically executing the reset step further comprises the steps of:
  (ix) stopping the peripheral device;
  (x) waiting a predetermined amount of time;
  (xi) starting and initializing the peripheral device
if the particular bus type used by the peripheral device is ISA.

7. A method for detecting and enabling a network controller which could use a variety of buses to gracefully recover from a network controller fault, the variety of buses further including PCI or ISA buses, comprising the steps of:
  (a) detecting whether the network controller has undergone a network controller fault;
  (b) determining whether any of a plurality of processes is currently being executed if the network controller fault has occurred, the plurality of processes further comprising those processes which could result in significant loss of data, loss of connection to a network or adversely affect the performance of the network controller if the network controller is reset during execution of any of the plurality of processes; and
  (c) automatically resetting the network controller if none of the plurality of processes is currently being executed, automatically resetting step (c) further comprising the steps of:
    (c1) determining a particular bus type of the network controller, step (c1) further comprising the steps of:
      (i) determining whether the particular bus type used by the network controller is PCI; and
      (ii) determining whether the particular bus type used by the network controller is ISA if the particular bus type used by the network controller is not PCI, and
    (c2) automatically executing a reset process capable of successfully resetting the network controller having the particular bus type determined in step (c1), automatically executing the reset step (c2) further comprising the steps of:
      (i) disabling a busmaster bit;
      (ii) setting a stop bit;
      (iii) initializing at least a portion of the network controller;
      (iv) enabling the busmaster bit;
      (v) starting the network controller;
      (vi) stopping the network controller;
      (vii) initializing at least the portion of the network controller; and
      (viii) starting the network controller;
  if the particular bus type used by the network controller is PCI.

8. The method of claim 7 wherein automatically executing the reset step further comprises the steps of:

(ix) stopping the network controller;

(x) waiting a predetermined amount of time;

(xi) starting and initializing the network controller if the particular bus type used by the network controller is ISA.

9. A system for resetting a peripheral device which could use a variety of buses, the variety of buses including PCI and ISA buses, the system comprising:

means for determining a particular bus type of the peripheral device, the bus type determining means further comprising:

means for determining whether the particular bus type used by the peripheral device is PCI; and means for determining whether the particular bus type used by the peripheral device is ISA if the particular bus type used by the peripheral device is not PCI; and means coupled to the means for determining for automatically executing a reset process capable of successfully resetting the peripheral device having the particular bus type without interrupting any of a plurality of processes, the plurality of processes further comprising those processes which could result in significant loss of data, loss of connection to a network or adversely affect the performance of the peripheral device if the peripheral device is reset during execution of any of the plurality of processes, the means for automatically executing the reset further comprising means for automatically executing a reset where the particular bus type used by the peripheral device is PCI, the means for automatically executing a reset where the particular bus type used by the peripheral device is PCI further comprising:

means for disabling a busmaster bit;

means coupled to the means for disabling for setting a stop bit;

means coupled to the means for setting for initializing at least a portion of the peripheral device;

means coupled to the means for initializing for enabling the busmaster bit;

means coupled to the means for initializing for starting the peripheral device;

means coupled to the means for initializing for stopping the peripheral device;

second means coupled to the means for stopping for initializing at least the portion of the peripheral device; and means coupled to the second means for initializing for starting the peripheral device.

10. The system of claim 9 wherein means for automatically executing the reset further comprise means for automatically executing the reset where the particular bus type used by the peripheral device is ISA, the means for automatically executing the reset where the particular bus type used by the peripheral device further comprise:

(b9) stopping the peripheral device;

(b10) waiting a predetermined amount of time;

(b11) starting and initializing the peripheral device if the particular bus type used by the peripheral device is ISA.

11. A system for resetting a network controller which could use a variety of buses, the variety of buses including PCI and ISA buses, the system comprising:

means for determining a particular bus type of the network controller, the means for determining the particular bus type further comprising:

means for determining whether the particular bus type used by the network controller is PCI; and means for determining whether the particular bus type used by the network controller is ISA if the particular bus type used by the network controller is not PCI; and means coupled to the means for determining for automatically executing a reset process capable of successfully resetting the network controller having the particular bus type without interrupting any of a plurality of processes, the plurality of processes further comprising those processes which could result in significant loss of data, loss of connection to a network or adversely affect the performance of the peripheral device if the peripheral device is reset during execution of any of the plurality of processes, the means for automatically executing the reset further comprising means for automatically executing a reset where the particular bus type used by the network controller is PCI, the means for automatically executing a reset where the particular bus type used by the network controller is PCI further comprising:

means for disabling a busmaster bit;

means coupled to the means for disabling for setting a stop bit;

means coupled to the means for setting for initializing at least a portion of the network controller;

means coupled to the means for initializing for enabling the busmaster bit;

means coupled to the means for initializing for starting the network controller;

means coupled to the means for initializing for stopping the network controller;

second means coupled to the means for stopping for initializing at least the portion of the network controller; and means coupled to the second means for initializing for starting the network controller.

12. The system of claim 1 wherein means for automatically executing the reset further comprise means for automatically executing the reset where the particular bus type used by the network controller is ISA, the means for automatically executing the reset where the particular bus type used by the network controller further comprise:

(b9) stopping the network controller;

(b10) waiting a predetermined amount of time;

(b11) starting and initializing the network controller if the particular bus type used by the network controller is ISA.

* * * * *